Patented July 4, 1933

1,916,797

UNITED STATES PATENT OFFICE

FRIEDRICH HÖRNER, OF FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY

PROCESS OF PREPARING ANTIMONATES

No Drawing. Application filed June 22, 1932, Serial No. 618,807, and in Germany July 3, 1931.

The present invention relates to a process of preparing antimonates.

Alkali metal antimonates, particularly sodium antimonate, have hitherto been made by fusing antimony, antimony oxide or antimony sulfide together with saltpeter and alkali metal hydroxide and separating the difficultly soluble antimonate from the other reaction products by extracting it. It is furthermore known to add to the reaction mixture indifferent compounds, such as chlorides, carbonates and sulfates of the alkalies or an excess of alkali metal hydroxide and saltpeter in order to prevent discoloration of the alkali metal antimonates produced.

I have now found that antimonates can be made in a much simpler manner than that hitherto known by intimately mixing an antimony oxide, for instance antimony trioxide with an alkali metal chlorate and an alkaline reacting metal compound, such as alkali metal carbonates, alkali metal oxides, alkali metal hydroxides, alkaline-earth metal carbonates, alkaline-earth metal oxides, alkaline-earth metal hydroxides, and causing the mixture to react. As alkaline reacting metal compounds there are to be mentioned particularly: $Na_2CO_3$, $K_2CO_3$, $Na_2O$, $K_2O$, NaOH, KOH, $BaCO_3$, $CaCO_3$, BaO, CaO. The reaction occurs for instance according to the following equation:

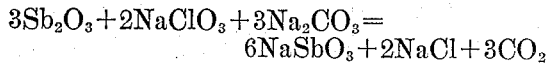

$$3Sb_2O_3 + 2NaClO_3 + 3Na_2CO_3 = 6NaSbO_3 + 2NaCl + 3CO_2$$

As this reaction is strongly exothermic without being explosive it is sufficient to heat the mixture to the reaction temperature of about 300° C. to 400° C.; the reaction sets in and is complete in a very short time; during this operation the temperature rises to 800° C.–1000° C. without fusing occurring.

Small quantities of the reaction mixture become volatile by formation of smoke due to the evolution of carbonic acid gas; if required, they can be collected according to one of the known methods and admixed to a new starting mixture. The reaction product is ground in a dry or wet condition, extracted with water and the difficultly soluble antimonate is filtered and washed. The small quantity of arsenic oxide which is always present in antimony oxide is transformed by the reaction into alkali metal arsenate and is dissolved on extraction with water.

The new process involves the advantage of yielding pure white alkali metal antimonates with a small supply of energy which is required only for starting the reaction, no particular additions being necessary.

The following example serves to illustrate the invention, but it is not intended to limit it thereto: 6.4 kilos of antimony trioxide (99.8 per cent.) are intimately mixed together with 1.7 kilos of sodium chlorate (97.9 per cent.) and 2.5 kilos of sodium carbonate (94.6 per cent.) and the mixture is heated until the reaction begins. The reaction product (9.2 kilos) is ground and extracted with water, filtered and dried. The filtrate is substantially free from antimony and contains only a very small quantity of sodium carbonate and sodium arsenate besides sodium chloride. The yield of antimonate amounts to 8.2 kilos.

I claim:

1. In the process of preparing antimonates the step which consists in heating a mixture of an antimony oxide, an alkali metal chlorate and an alkaline reacting metal compound selected from the group consisting of alkali metal carbonates, alkali metal oxides, alkali metal hydroxides, alkaline-earth metal carbonates, alkaline-earth metal oxides, alkaline-earth metal hydroxides.

2. In the process of preparing antimonates the step which consists in heating a mixture of an antimony oxide, an alkali metal chlorate and an alkaline reacting metal compound selected from the group consisting of alkali metal carbonates, alkali metal oxides, alkali metal hydroxides.

3. In the process of preparing antimonates the step which consists in heating a mixture of an antimony oxide, an alkali metal chlorate and an alkali metal carbonate, to a temperature of about 300° C. to 400° C.

4. In the process of preparing antimonates the step which consists in heating a mixture of antimony trioxide, sodium chlorate, and sodium carbonate to a temperature of about 300° C. to 400° C.

In testimony whereof, I affix my signature.

FRIEDRICH HÖRNER.